(12) United States Patent  (10) Patent No.: US 7,903,348 B2
Sensui  (45) Date of Patent: Mar. 8, 2011

(54) REAR-FOCUS OPTICAL SYSTEM, IMAGING APPARATUS AND METHOD FOR FOCUSING THE SAME

(75) Inventor: Takayuki Sensui, Tokyo (JP)

(73) Assignee: Nikon Corporation, Tokyo (JP)

( * ) Notice: Subject to any disclaimer, the term of this patent is extended or adjusted under 35 U.S.C. 154(b) by 18 days.

(21) Appl. No.: 12/388,571

(22) Filed: Feb. 19, 2009

(65) Prior Publication Data

US 2009/0226159 A1    Sep. 10, 2009

(30) Foreign Application Priority Data

Mar. 4, 2008    (JP) .................................. 2008-053714

(51) Int. Cl.
  *G02B 9/06* (2006.01)
  *G02B 9/04* (2006.01)
(52) U.S. Cl. ......................................... 359/794; 359/793
(58) Field of Classification Search .................. 359/761, 359/770, 784, 793, 794
See application file for complete search history.

(56) References Cited

U.S. PATENT DOCUMENTS

| 6,697,202 | B2 | 2/2004 | Mori |
| 6,865,031 | B2 | 3/2005 | Hoshi |
| 7,706,087 | B2 * | 4/2010 | Obama ........................ 359/794 |
| 2009/0257125 | A1 * | 10/2009 | Take ............................ 359/557 |

FOREIGN PATENT DOCUMENTS

| JP | 01-155310 A | 6/1989 |
| JP | 06-130291 A | 5/1994 |
| JP | 08-152557 A | 6/1996 |
| JP | 2003-029141 A | 1/2003 |
| JP | 2003-241084 A | 8/2003 |
| JP | 2006-201526 A | 8/2006 |

* cited by examiner

*Primary Examiner* — David N Spector
(74) *Attorney, Agent, or Firm* — Miles & Stockbridge P.C.

(57) ABSTRACT

Providing a compact rear-focus optical system having excellent optical performance, an imaging apparatus, and a method for focusing the rear-focus optical system. The system includes, in order from an object, a first lens group G1 having positive refractive power, an aperture stop S, and a second lens group G2. At least a portion of the second lens group G2 is movable along an optical axis of the rear-focus optical system upon focusing. Given conditional expressions are satisfied.

15 Claims, 14 Drawing Sheets

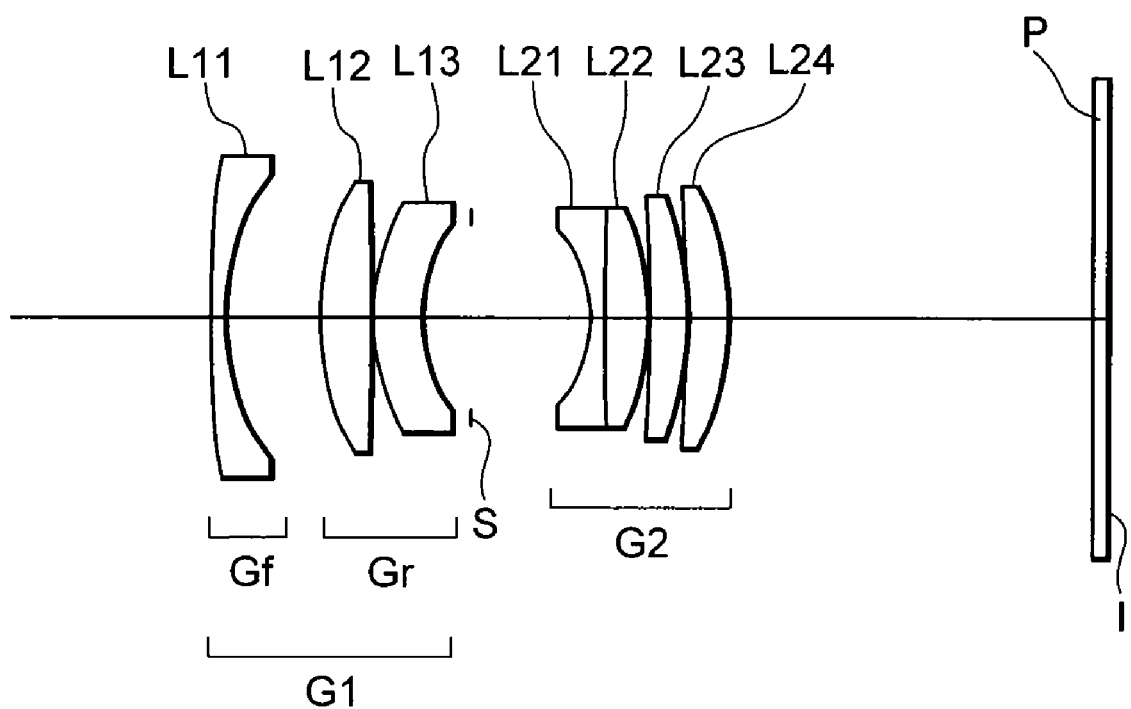

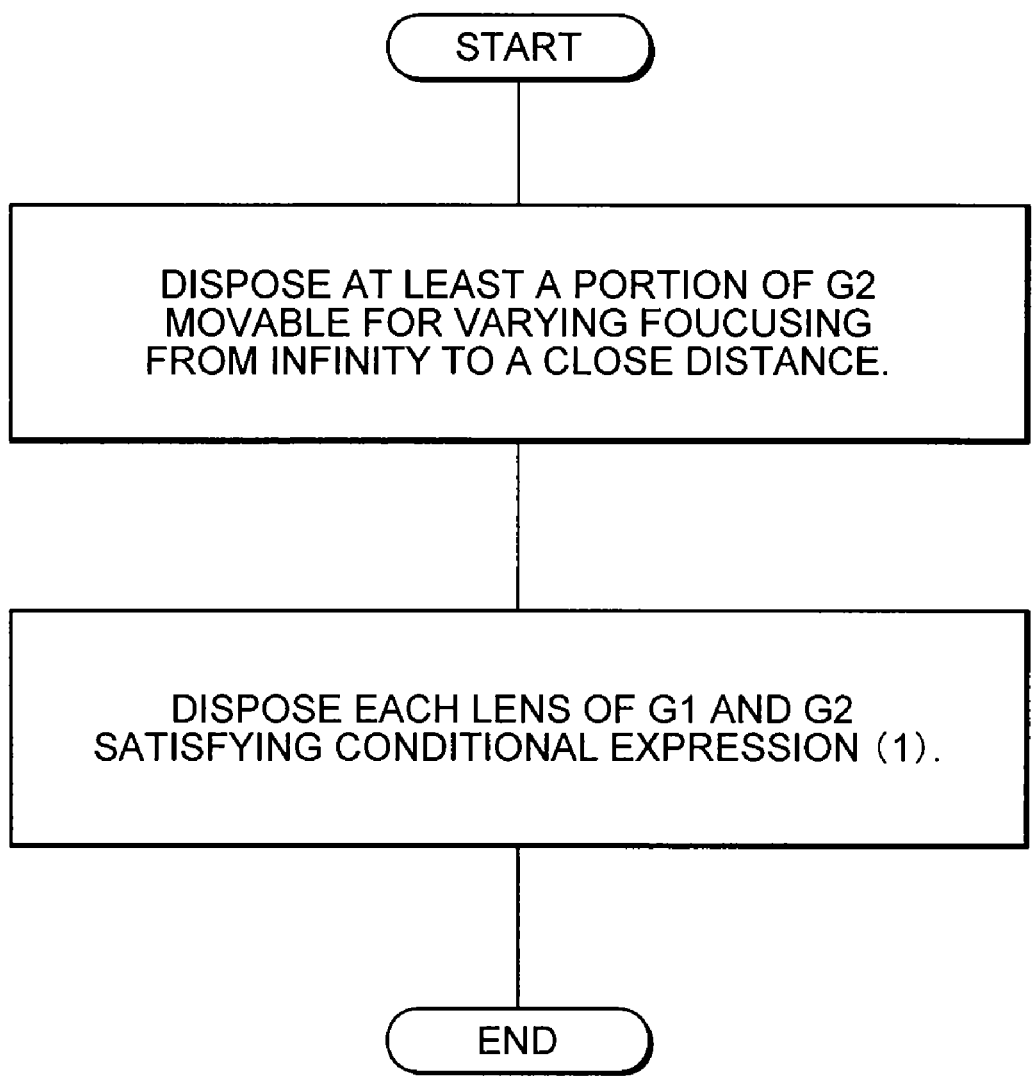

REAR-FOCUS OPTICAL SYSTEM, IMAGING APPARATUS AND METHOD FOR FOCUSING THE SAME

The disclosure of the following priority applications are herein incorporated by reference:
Japanese Patent Application No. 2008-053714; and
Japanese Patent Application No. 2009-012357.

BACKGROUND OF THE INVENTION

1. Field of the Invention

The present invention relates to a rear-focus optical system, an imaging apparatus, and a method for focusing the rear-focus optical system.

2. Related Background Art

There have been proposed a lot of so-called Gaussian type lenses having substantially symmetrical power distribution with respect to an aperture stop as a large-aperture standard lens used for a film camera and a still video camera in, for example, Japanese patent Application Laid-Open No. 1-155310. In such a Gaussian type lens, there have been announced various proposals in which correction of variation in optical performance upon varying focusing from an object locating at infinity to an object locating at a close distance is carried out. Moreover, there has been proposed a so-called retrofocus type standard lens in which strong negative refractive power is disposed to the object side of the aperture stop deforming a symmetrical power distribution of a Gaussian type.

However, conventional lenses described above have a problem that the dimension of the lens is not sufficiently compact.

SUMMARY OF THE INVENTION

The present invention is made in view of the above-described problem, and has an object to provide a compact rear-focus optical system having high optical performance, an imaging apparatus, and a method for focusing the rear-focus optical system.

According to a first aspect of the present invention, there is provided a rear-focus optical system comprising, in order from an object: a first lens group having positive refractive power; an aperture stop; and a second lens group having positive refractive power; at least one portion of the second lens group being movable along an optical axis of the rear-focus optical system upon focusing, the following conditional expression (1) being satisfied:

$$0.80 < f2/f < 1.30 \qquad (1)$$

where f2 denotes a focal length of the second lens group, and f denotes a focal length of the rear-focus optical system.

According to a second aspect of the present invention, there is provided an imaging apparatus equipped with the rear-focus optical system according to the first aspect.

According to a third aspect of the present invention, there is provided a method for manufacturing a rear-focus optical system that includes, in order from an object, a first lens group having positive refractive power, an aperture stop, and a second lens group having positive refractive power, the method comprising steps of: providing at least a portion of the second lens group movable along an optical axis of the rear-focus optical system upon focusing; and providing each lens of the first lens group and the second lens group satisfying the following conditional expression (1):

$$0.80 < f2/f < 1.30 \qquad (1)$$

where f2 denotes a focal length of the second lens group, and f denotes a focal length of the rear-focus optical system.

The present invention makes it possible to provide a compact rear-focus optical system having excellent optical performance, an imaging apparatus, and a method for focusing the rear-focus optical system.

BRIEF DESCRIPTION OF THE DRAWINGS

FIGS. 2A and 2B are graphs showing various aberrations of the rear-focus optical system according to Example 1 in which FIG. 2A shows upon focusing on infinity, and FIG. 2B shows upon imaging magnification of $\beta=-1/40$.

FIGS. 4A and 4B are graphs showing various aberrations of the rear-focus optical system according to Example 2 in which FIG. 4A shows upon focusing on infinity, and FIG. 4B shows upon imaging magnification of $\beta=-1/40$.

FIGS. 6A and 6B are graphs showing various aberrations of the rear-focus optical system according to Example 3 in which FIG. 6A shows upon focusing on infinity, and FIG. 6B shows upon imaging magnification of $\beta=-1/40$.

FIGS. 8A and 8B are graphs showing various aberrations of the rear-focus optical system according to Example 4 in which FIG. 8A shows upon focusing on infinity, and FIG. 8B shows upon imaging magnification of $\beta=-1/40$.

FIG. 9 is a sectional view showing a lens configuration of a rear-focus optical system according to Example 5.

FIGS. 10A and 10B are graphs showing various aberrations of the rear-focus optical system according to Example 5 in which FIG. 10A shows upon focusing on infinity, and FIG. 10B shows upon imaging magnification of $\beta=-1/40$.

FIGS. 12A and 12B are graphs showing various aberrations of the rear-focus optical system according to Example 6 in which FIG. 12A shows upon focusing on infinity, and FIG. 12B shows upon imaging magnification of $\beta=-1/40$.

FIG. 14 is a flowchart showing a procedure of a method for manufacturing the rear-focus optical system according to the present application.

DESCRIPTION OF THE MOST PREFERRED EMBODIMENT

Figure 1:
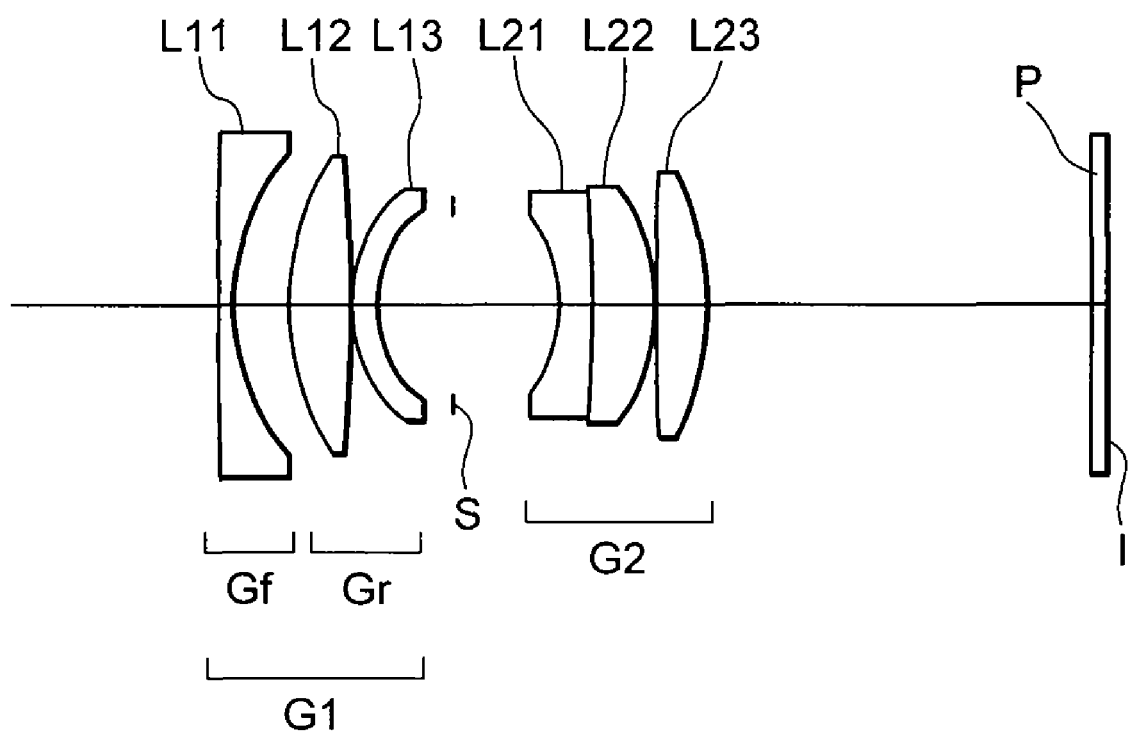
FIG. 1 is a sectional view showing a lens configuration of a rear-focus optical system according to Example 1.

A rear-focus optical system, an imaging apparatus, and a method for focusing the rear-focus optical system according to the present application will be explained below.

A rear-focus optical system according to the present application includes, in order from an object, a first lens group having positive refractive power, an aperture stop, and a second lens group having positive refractive power. Upon varying focusing from an object locating at infinity to an object locating at a close distance, at least a portion of the second lens group is moved. The following conditional expressions (1) and (2) are satisfied:

$$0.80 < f2/f < 1.30 \qquad (1)$$

$$0.30 < \Sigma D2/f < 0.60 \qquad (2)$$

where f2 denotes a focal length of the second lens group, f denotes a focal length of the rear-focus optical system, and ΣD2 denotes a thickness of the second lens group along an optical axis.

Conditional expression (1) defines the focal length of the second lens group in order to secure an appropriate moving amount of the focusing lens group (at least a portion of the second lens group) with suppressing variation in aberration upon varying focusing.

When the ratio f2/f is equal to or exceeds the upper limit of conditional expression (1), the focal length of the second lens group becomes too large. Accordingly, in order to secure the moving amount of the focusing lens group upon varying focusing, which becomes too large, the number of the lenses in the second lens group has to be reduced, so that it becomes difficult to suppress close-rang aberration fluctuation of spherical aberration and, in particular, coma.

In order to secure the effect of the present application, it is preferable to set the upper limit of conditional expression (1) to 1.20.

On the other hand, when the ratio f2/f is equal to or falls below the lower limit of conditional expression (1), the focal length of the second lens group becomes too small. Accordingly, it becomes difficult to correct spherical aberration and coma, and on top of that severe manufacturing accuracy is required, so that it is undesirable.

In order to secure the effect of the present application, it is preferable to set the lower limit of conditional expression (1) to 0.90.

Conditional expression (2) defines the thickness of the second lens group along the optical axis in order to realize both lightening the focusing lens group and securing high optical performance in the rear-focus optical system.

When the ratio ΣD2/f is equal to or exceeds the upper limit of conditional expression (2), the thickness of the second lens group along the optical axis becomes too large. Accordingly, the lens portion of the second lens group as well as the lens barrel portion supporting thereof become large and heavy, and on top of that the moving space for the focusing lens group becomes small. As a result, in order to make the focusing lens group possible to focus on an object locating at a close distance within such a small moving space, the focal length of the second lens group has to be small, so that it becomes difficult to correct spherical aberration and coma.

In order to secure the effect of the present application, it is preferable to set the upper limit of conditional expression (2) to 0.50.

On the other hand, when the ratio ΣD2/f is equal to or falls below the lower limit of conditional expression (2), the thickness of the second lens group along the optical axis becomes too small. Accordingly, the number of lenses constituting the second lens group has to be reduced, so that it becomes difficult to sufficiently correct aberrations.

In order to secure the effect of the present application, it is preferable to set the lower limit of conditional expression (2) to 0.33.

In a rear-focus optical system according to the present application, the following conditional expression (3) is preferably satisfied:

$$2.0 < f1/f < 8.0 \quad (3)$$

where f1 denotes a focal length of the first lens group, and f denotes a focal length of the rear-focus optical system.

Conditional expression (3) defines the focal length of the first lens group in order to excellently correct various aberrations with securing a short total lens length and a sufficient back focal length in a rear-focus optical system according to the present application.

When the ratio f1/f is equal to or exceeds the upper limit of conditional expression (3), the focal length of the first lens group becomes too large, and the total lens length also becomes too large. Accordingly, in order to reduce this, the focal length of the second lens group has to be small, so that it becomes difficult to realize both of shortening the total lens length and correcting spherical aberration.

In order to secure the effect of the present application, it is preferable to set the upper limit of conditional expression (3) to 7.00.

On the other hand, when the ratio f1/f is equal to or falls below the lower limit of conditional expression (3), the focal length of the first lens group becomes too small. Accordingly, it becomes difficult to correct spherical aberration and distortion generated in the first lens group.

In order to secure the effect of the present application, it is preferable to set the lower limit of conditional expression (3) to 3.00.

In a rear-focus optical system according to the present application, the following conditional expression (4) is preferably satisfied:

$$0.90 < D2/f < 0.60 \quad (4)$$

where D2 denotes a distance along the optical axis between the first lens group and the second lens group upon focusing on an object locating at infinity, and f denotes a focal length of the rear-focus optical system.

Conditional expression (4) defines a distance along the optical axis between the first lens group and the second lens group in a rear-focus optical system according to the present application in order to secure both of the sufficient back focal length and the moving space of the second lens group with keeping high optical performance.

When the ratio D2/f is equal to or exceeds the upper limit of conditional expression (4), the distance between the first lens group and the second lens group becomes too large, so that the back focal length becomes too short. Accordingly, in order to compensate the back focal length, the thickness of the second lens group has to be small by reducing the number of the lenses composing the second lens group, so that it becomes difficult to correct spherical aberration and coma.

In order to secure the effect of the present application, it is preferable to set the upper limit of conditional expression (4) to 0.56.

On the other hand, when the ratio D2/f is equal to or falls below the lower limit of conditional expression (4), the distance along the optical axis between the first lens group and the second lens group becomes too short. Accordingly, in order to focus on an object locating at close distance by a small moving amount of the focusing lens group, the focal length of the second lens group has to be shortened, so that it becomes difficult to correct spherical aberration. Accordingly, it is undesirable.

In order to secure the effect of the present application, it is preferable to set the lower limit of conditional expression (4) to 0.40.

In a rear-focus optical system according to the present application, the first lens group includes, in order from the object, a front lens group having negative refractive power, and a rear lens group having positive refractive power. A distance along the optical axis between the front lens group and the rear lens group is the largest among respective distances between adjoining lenses composing the first lens group. The following conditional expression (5) is preferably satisfied:

$$1.10 < (-f11)/f < 3.50 \tag{5}$$

where f11 denotes a focal length of the front lens group in the first lens group, and f denotes a focal length of the rear-focus optical system.

The front lens group has negative refractive power and includes a lens in which an emerging angle of elevation of a paraxial on-axis ray becomes the maximum value in negative region. The front lens group is composed of each lens disposing to the object side of the above-mentioned lens and has negative refractive power. A rear-focus optical system according to the present application can be considered as a retrofocus type lens composed of the front lens group and a lens group disposing to the image side of the front lens group that includes the rear lens group and the second lens group.

Conditional expression (5) defines a focal length of the front lens group in order to appropriately set a so-called degree of retrofocus of a rear-focus optical system according to the present application. The degree of retrofocus is a ratio of the back focal length to the focal length of the rear-focus optical system according to the present application.

When the ratio $(-f11)/f$ is equal to or exceeds the upper limit of conditional expression (5), the focal length of the front lens group becomes too large, and the degree of divergence decreases, so that the back focal length becomes too short. As a result, in order to secure the back focal length, the thickness of the second lens group has to be reduced by reducing the number of lenses constituting the second lens group, so that it becomes difficult to correct spherical aberration and coma.

In order to secure the effect of the present application, it is preferable to set the upper limit of conditional expression (5) to 2.50.

On the other hand, when the ratio $(-f11)/f$ is equal to or falls below the lower limit of conditional expression (5), the focal length of the front lens group becomes too small, and the degree of divergence becomes large, so that aberrations according to an angle of view such as distortion and astigmatism become worse.

In order to secure the effect of the present application, it is preferable to set the lower limit of conditional expression (5) to 1.20.

In a rear-focus optical system according to the present application, the most object side lens surface of the second lens group is a concave surface facing the object, and the following conditional expression (6) is preferably satisfied:

$$0.30 < (-R21)/f < 0.50 \tag{6}$$

where R21 denotes a radius of curvature of the concave surface facing the object, and f denotes a focal length of the rear-focus optical system.

Conditional expression (6) defines the radius of curvature of the most object side lens surface in the second lens group in order to balance optical performance with facility of manufacturing thereof.

When the ratio $(-R21)/f$ is equal to or exceeds the upper limit of conditional expression (6), an absolute value of the radius of curvature of the lens surface becomes too large, so that the back focal length becomes small. Accordingly, in order to compensate the back focal length, the number of lenses constituting the second lens group has to be reduced, or refractive power of the front lens group has to be increased. In either case, spherical aberration and field angle aberrations such as distortion and curvature of field become worse.

In order to secure the effect of the present application, it is preferable to set the upper limit of conditional expression (6) to 0.45.

On the other hand, when the ratio $(-R21)/f$ is equal to or falls below the lower limit of conditional expression (6), an absolute value of the radius of curvature of the aforementioned lens surface becomes too large. Accordingly, sagittal flare generated on the lens surface becomes large, so that optical performance becomes worse. Moreover, the lens surface becomes too sensitive to decentering, so that a high degree of assembling accuracy is required. Therefore, it is undesirable.

In order to secure the effect of the present application, it is preferable to set the lower limit of conditional expression (6) to 0.35.

In a rear-focus optical system according to the present application, the second lens group preferably includes an aspherical surface.

With this configuration, a rear-focus optical system according to the present application makes it possible to excellently correct spherical aberration and coma.

An imaging apparatus according to the present application is equipped with the rear-focus optical system described above.

With this configuration, it becomes possible to realize a compact imaging apparatus having excellent optical performance.

A method for focusing a rear-focus optical system according to the present application comprising steps of:

providing the rear-focus optical system comprising, in order from an object, a first lens group having positive refractive power, an aperture stop, and a second lens group having positive refractive power;

satisfying the following conditional expressions (1) and (2):

$$0.80 < f2/f < 1.30 \tag{1}$$

$$0.30 < \Sigma D2/f < 0.60 \tag{2}$$

where f2 denotes a focal length of the second lens group, f denotes a focal length of the rear-focus optical system, and ΣD2 denotes a thickness of the second lens group along an optical axis; and moving at least a portion of the second lens group upon varying focusing from an object locating at infinity to an object locating at a close distance.

With this configuration, it becomes possible to provide a method for focusing a compact rear-focus optical system having excellent optical performance.

A rear-focus optical system according to each numerical example of the present application is explained below with reference to accompanying drawings.

Example 1

FIG. 1 is a sectional view showing a lens configuration of a rear-focus optical system according to Example 1 of the present application.

The rear-focus optical system according to Example 1 is composed of, in order from an object, a first lens group G1 having positive refractive power, an aperture stop S, and a second lens group G2 having positive refractive power.

The first lens group G1 is composed of, in order from the object, a front lens group Gf having negative refractive power, and a rear lens group Gr having positive refractive power.

The front lens group Gf is composed of a negative meniscus lens L11 having a convex surface facing the object.

The rear lens group Gr is composed of, in order from the object, a double convex positive lens L12, and a negative meniscus lens L13 having a convex surface facing the object.

The second lens group G2 is composed of, in order from the object, a negative meniscus lens L21 having a concave surface facing the object, a positive meniscus lens L22 having a concave surface facing the object, and a double convex positive lens L23 having an aspherical surface facing the object.

A low-pass filter P is disposed on an image plane I. This configuration is the same as the following Examples.

In the rear-focus optical system according to Example 1, varying focusing from an object locating at infinity to an object locating at a close distance is carried out by moving the second lens group G2 along the optical axis.

Various values associated with the rear-focus optical system according to Example 1 are listed in Table 1.

In Table 1, f denotes a focal length of the rear-focus optical system, and Bf denotes a back focal length.

In [Specifications], FNO denotes an f-number, 2ω denotes an angle of view in degree, Y denotes an image height, and TL denotes a total lens length.

In [Lens Data], the left most column "i" shows the lens surface number counted in order from the object side, the second column "r" shows a radius of curvature of the lens surface, the third column "d" shows a distance to the next surface, the fourth column "nd" shows a refractive index of the material at d-line (wavelength λ=587.6 nm), and the fifth column "vd" shows an Abbe number of the material at d-line (wavelength λ=587.6 nm). In the fifth column "nd" the refractive index of the air nd=1.000000 is omitted. In the second column "r", r=∞ denotes a plane surface.

In [Aspherical Surface Data], an aspherical surface is exhibited by the following expression:

$$S(y)=y^2/r/[1+[1-\kappa(y^2/r^2)]^{1/2}]+A4 \times y^4+A6 \times y^6+A8 \times y^8$$

where y denotes a vertical height from the optical axis, S(y) denotes a sag amount which is a distance along the optical axis from the tangent surface at the vertex of the aspherical surface to the aspherical surface at the vertical height y from the optical axis, r denotes a radius of curvature of a reference sphere (a paraxial radius of curvature), κ denotes a conical coefficient, An denotes aspherical coefficient of n-th order, "E−n" denotes "×10$^{-n}$", for example, "1.234 E−05" denotes "1.234×10$^{-5}$" and the position of an aspherical surface is expressed by attaching "*" to the right side of the surface number. An aspherical coefficient having a value of 0 is omitted.

In [Variable Distances], imaging magnification β, and variable distances di with respect to each focusing state are shown.

In [Lens Group Data], the start surface number i of each lens group and a focal length of each lens group are shown.

In [Values for Conditional Expressions], values for respective conditional expressions are shown.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples, so that duplicated explanations are omitted.

TABLE 1

[Specifications]

| | |
|---|---|
| f = | 36.000 |
| FNO = | 1.85 |
| 2ω = | 45.6 |
| Y = | 14.75 |
| TL = | 86.50 |

[Lens Data]

| i | r | d | nd | vd |
|---|---|---|---|---|
| 1 | 424.2496 | 1.4000 | 1.516330 | 64.15 |
| 2 | 23.2189 | 5.2867 | | |
| 3 | 26.1583 | 5.9205 | 1.729157 | 54.68 |
| 4 | −273.1932 | 0.1000 | | |
| 5 | 14.9149 | 2.4776 | 1.772499 | 49.60 |
| 6 | 12.3301 | 7.5786 | | |
| 7 | ∞ | (d7) | Aperture Stop S | |
| 8 | −15.0479 | 3.0000 | 1.846660 | 23.78 |
| 9 | −274.2622 | 0.2429 | | |
| 10 | −155.0749 | 6.0000 | 1.772499 | 49.60 |
| 11 | −22.0079 | 0.1000 | | |
| 12* | 164.5291 | 0.1000 | 1.553890 | 38.09 |
| 13 | 164.5291 | 4.8665 | 1.804000 | 46.58 |
| 14 | −31.2668 | (d14) | | |
| 15 | ∞ | 1.5000 | 1.516330 | 64.15 |
| 16 | ∞ | 0.0000 | | |

[Aspherical Surface Data]
Surface Number: 12

| | |
|---|---|
| K = | 0.0000 |
| A4 = | −7.08700E−06 |
| A6 = | 8.61970E−10 |
| A8 = | 1.45440E−11 |

[Variable Distances]

| | Infinity | Close Distance |
|---|---|---|
| β = | 0.000 | −1/40 |
| d7 = | 10.42710 | 9.66060 |
| d14 = | 37.50000 | 38.26650 |

[Lens Group Data]

| Group | i | focal length |
|---|---|---|
| G1 | 1 | 140.006 |
| G2 | 8 | 36.186 |

[Values for Conditional Expressions]

| | |
|---|---|
| (1): f2/f = | 1.01 |
| (2): ΣD2/f = | 0.40 |
| (3): f1/f = | 3.89 |
| (4): D2/f = | 0.51 |
| (5): (−fl1)/f = | 1.32 |
| (6): (−R21)/f = | 0.42 |

Figure 2A:
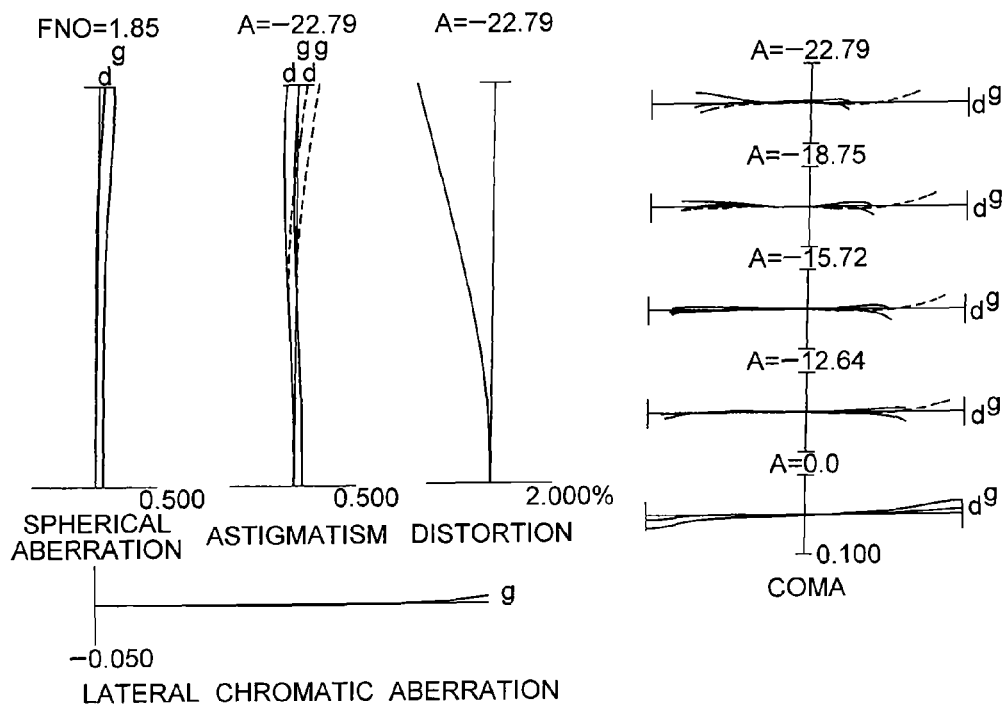
Figure 2B:
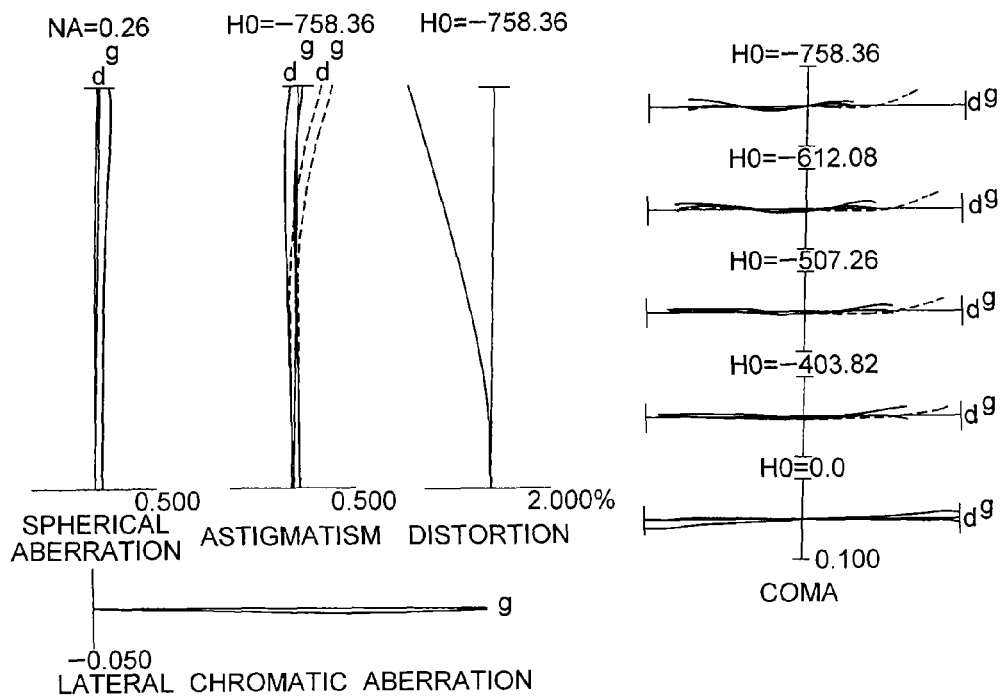

FIGS. 2A and 2B are graphs showing various aberrations of the rear-focus optical system according to Example 1 in which FIG. 2A shows upon focusing on infinity, and FIG. 2B shows upon imaging magnification of β=−1/40.

In respective graphs, FNO denotes an f-number, NA denotes a numerical aperture, A denotes a half angle of view, HO denotes an object height. In graphs showing spherical aberration, an f-number or a numerical aperture with respect to the maximum aperture is shown. In graphs showing astigmatism or distortion, the maximum value of a half angle of view or an object height is shown. Moreover, d denotes aberration curve at d-line (wavelength λ=587.6 nm), and g denotes aberration curve at g-line (wavelength λ=435.8 nm).

In graphs showing astigmatism, a solid line indicates a sagittal image plane, and a broken line indicates a meridional image plane.

The above-described explanation regarding various aberration graphs is the same as the other Examples.

As is apparent from the respective graphs, the rear-focus optical system according to Example 1 shows superb optical performance as a result of good corrections to various aberrations.

Example 2

Figure 3:
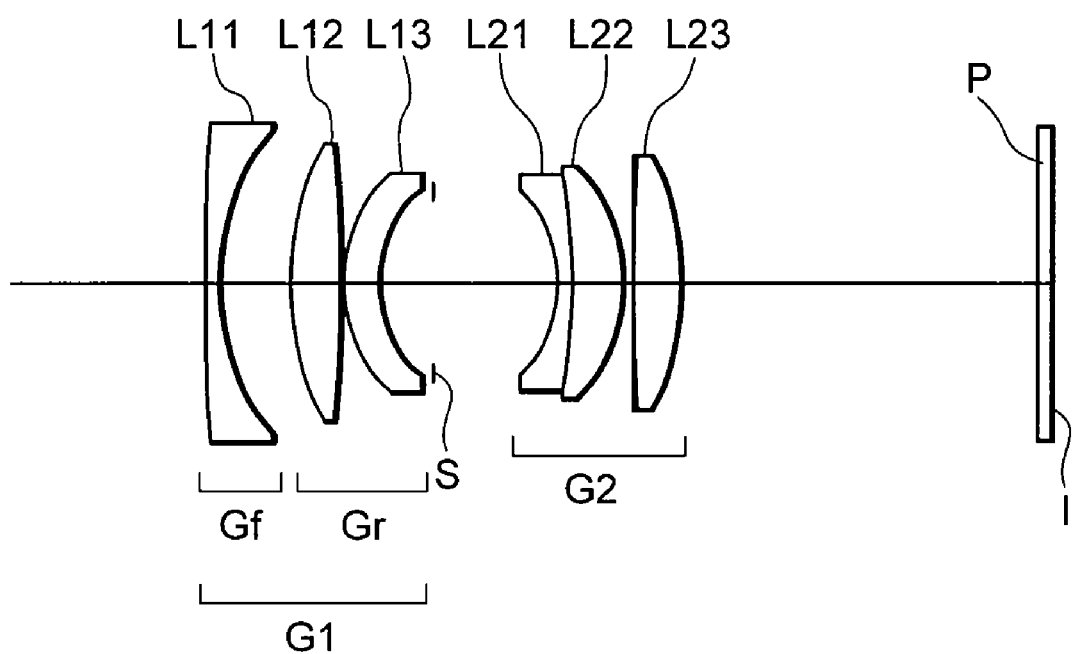
FIG. 3 is a sectional view showing a lens configuration of a rear-focus optical system according to Example 2.

FIG. 3 is a sectional view showing a lens configuration of a rear-focus optical system according to Example 2 of the present application.

The rear-focus optical system according to Example 2 is composed of, in order from an object, a first lens group G1 having positive refractive power, an aperture stop S, and a second lens group G2 having positive refractive power.

The first lens group G1 is composed of, in order from the object, a front lens group Gf having negative refractive power, and a rear lens group Gr having positive refractive power.

The front lens group Gf is composed of a negative meniscus lens L11 having a convex surface facing the object.

The rear lens group Gr is composed of, in order from the object, a double convex positive lens L12, and a negative meniscus lens L13 having a convex surface facing the object.

The second lens group G2 is composed of, in order from the object, a cemented lens constructed by a negative meniscus lens L21 having a concave surface facing the object cemented with a positive meniscus lens L22 having a concave surface facing the object, and a double convex positive lens L23 having an aspherical surface facing the object.

In the rear-focus optical system according to Example 2, varying focusing from an object locating at infinity to an object locating at a close distance is carried out by moving the second lens group G2 along the optical axis.

Various values associated with the rear-focus optical system according to Example 2 are listed in Table 2.

TABLE 2

[Specifications]

| | |
|---|---|
| f = | 36.000 |
| FNO = | 1.85 |
| 2ω = | 45.6 |
| Y = | 14.75 |
| TL = | 89.00 |

[Lens Data]

| i | r | d | nd | vd |
|---|---|---|---|---|
| 1 | 242.3312 | 1.4000 | 1.589130 | 61.18 |
| 2 | 25.5400 | 7.4696 | | |
| 3 | 30.1408 | 5.3800 | 1.696797 | 55.53 |
| 4 | −176.1210 | 0.3128 | | |
| 5 | 16.0722 | 3.8087 | 1.846660 | 23.78 |
| 6 | 12.8640 | 5.9903 | | |
| 7 | ∞ | (d7) | Aperture stop S | |
| 8 | −13.9570 | 1.5420 | 1.846660 | 23.78 |
| 9 | −67.5953 | 5.1386 | 1.772499 | 49.60 |
| 10 | −18.6160 | 1.1581 | | |
| 11* | 232.5430 | 0.1000 | 1.553890 | 38.09 |
| 12 | 232.5430 | 4.8872 | 1.804000 | 46.58 |
| 13 | −31.2958 | (d13) | | |

TABLE 2-continued

| 14 | ∞ | 1.5000 | 1.516330 | 64.15 |
|---|---|---|---|---|
| 15 | ∞ | 0.0000 | | |

[Aspherical Surface Data]
Surface Number: 11

| | |
|---|---|
| K = | 0.0000 |
| A4 = | −7.99060E−06 |
| A6 = | 4.54240E−09 |
| A8 = | 7.55450E−13 |

[Variable Distances]

| | Infinity | Close Distance |
|---|---|---|
| β = | 0.000 | −1/40 |
| d7 = | 12.81260 | 11.88469 |
| d13 = | 37.50000 | 38.42791 |

[Lens Group Data]

| Group | i | focal length |
|---|---|---|
| G1 | 1 | 192.860 |
| G2 | 8 | 36.339 |

[Values for Conditional Expressions]

| | |
|---|---|
| (1): f2/f = | 1.01 |
| (2): ΣD2/f = | 0.36 |
| (3): f1/f = | 5.36 |
| (4): D2/f = | 0.52 |
| (5): (−f11)/f = | 1.35 |
| (6): (−R21)/f = | 0.39 |

Figure 4A:
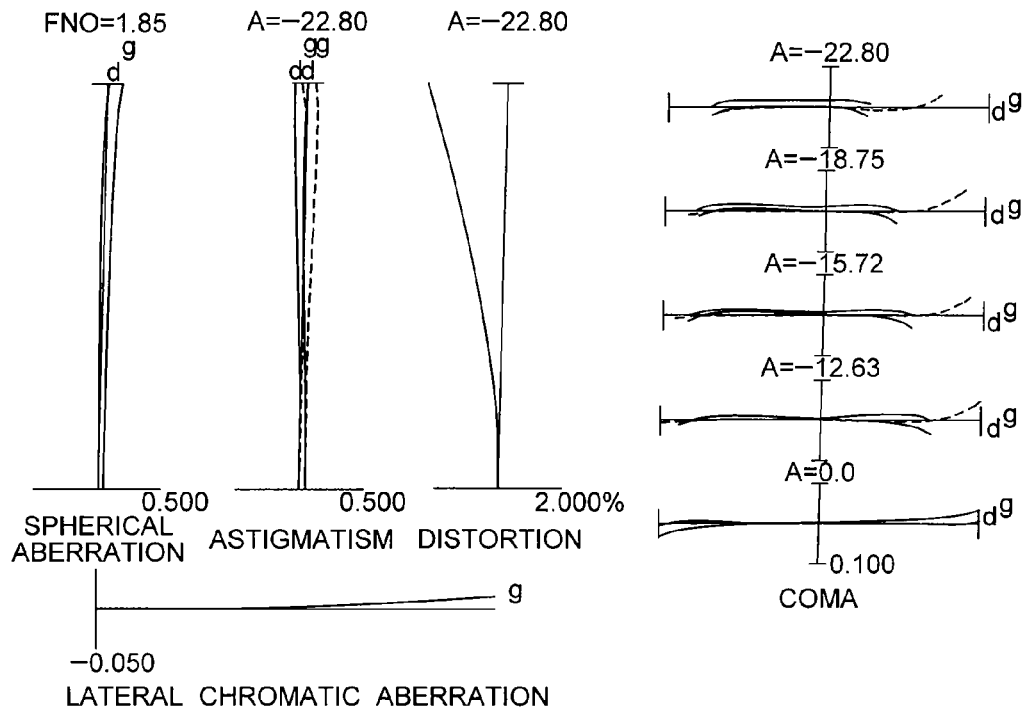
Figure 4B:
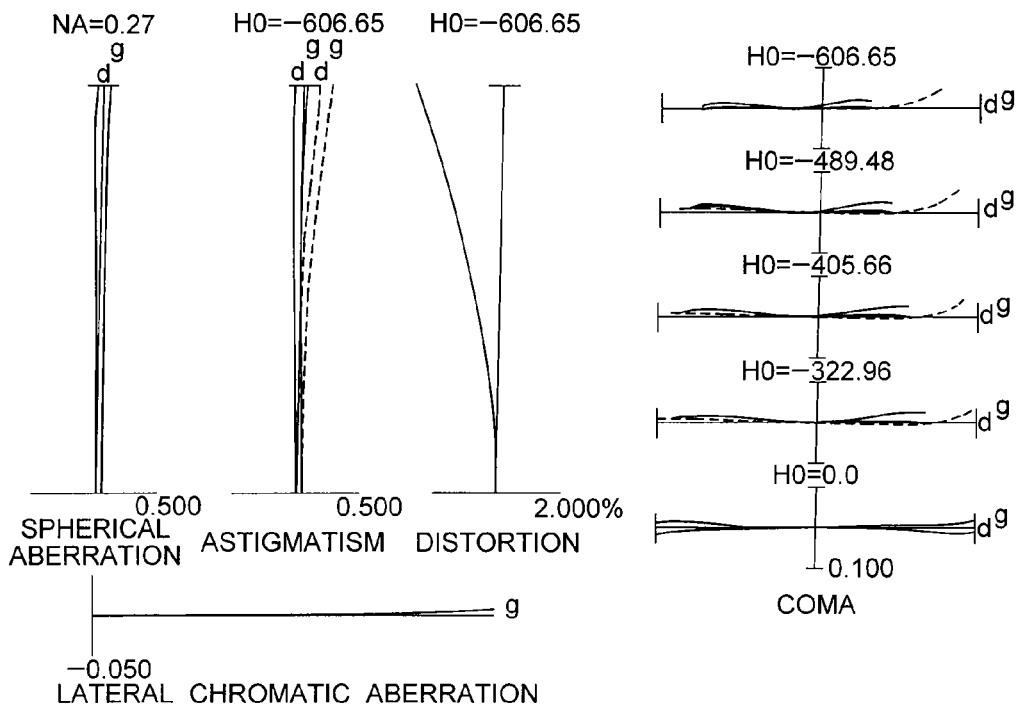

FIGS. 4A and 4B are graphs showing various aberrations of the rear-focus optical system according to Example 2 in which FIG. 4A shows upon focusing on infinity, and FIG. 4B shows upon imaging magnification of β=−1/40.

As is apparent from the respective graphs, the rear-focus optical system according to Example 2 shows superb optical performance as a result of good corrections to various aberrations.

Example 3

Figure 5:
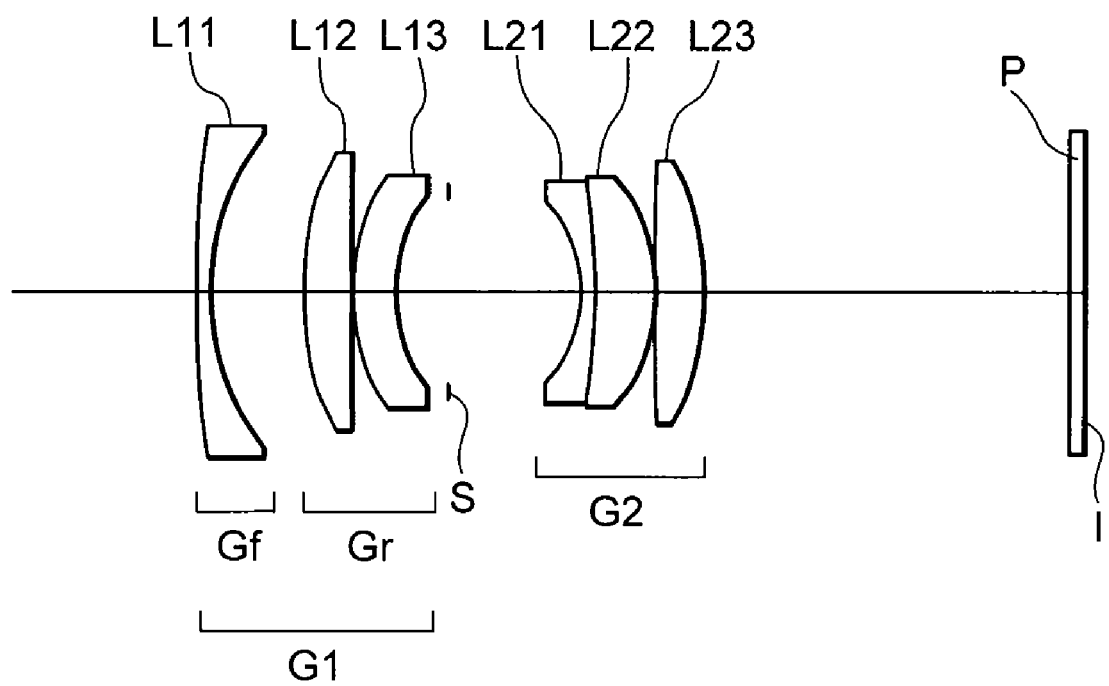
FIG. 5 is a sectional view showing a lens configuration of a rear-focus optical system according to Example 3.

FIG. 5 is a sectional view showing a lens configuration of a rear-focus optical system according to Example 3 of the present application.

The rear-focus optical system according to Example 3 is composed of, in order from an object, a first lens group G1 having positive refractive power, an aperture stop S, and a second lens group G2 having positive refractive power.

The first lens group G1 is composed of, in order from the object, a front lens group Gf having negative refractive power, and a rear lens group Gr having positive refractive power.

The front lens group Gf is composed of a negative meniscus lens L11 having a convex surface facing the object.

The rear lens group Gr is composed of, in order from the object, a double convex positive lens L12, and a negative meniscus lens L13 having a convex surface facing the object.

The second lens group G2 is composed of, in order from the object, a cemented lens constructed by a negative meniscus lens L21 having a concave surface facing the object cemented with a positive meniscus lens L22 having a concave surface facing the object, and a double convex positive lens L23 having an aspherical surface facing the object.

In the rear-focus optical system according to Example 3, varying focusing from an object locating at infinity to an object locating at a close distance is carried out by moving the second lens group G2 along the optical axis.

Various values associated with the rear-focus optical system according to Example 3 are listed in Table 3.

TABLE 3

[Specifications]

| | |
|---|---|
| f = | 36.000 |
| FNO = | 1.85 |
| 2ω = | 45.7 |
| Y = | 14.75 |
| TL = | 92.00 |

[Lens Data]

| i | r | d | nd | vd |
|---|---|---|---|---|
| 1 | 176.0137 | 1.4000 | 1.589130 | 61.18 |
| 2 | 27.3013 | 9.0700 | | |
| 3 | 33.2143 | 4.9400 | 1.772500 | 49.61 |
| 4 | −347.2568 | 0.1000 | | |
| 5 | 18.6027 | 4.4500 | 1.846660 | 23.78 |
| 6 | 14.2382 | 6.9012 | | |
| 7 | ∞ | (d7) | Aperture Stop S | |
| 8 | −14.5276 | 1.1000 | 1.846660 | 23.78 |
| 9 | −77.2310 | 5.5900 | 1.772500 | 49.61 |
| 10 | −18.6999 | 1.6700 | | |
| 11* | 172.8130 | 0.1000 | 1.553890 | 38.09 |
| 12 | 172.8130 | 5.6500 | 1.804000 | 46.58 |
| 13 | −34.0594 | (d13) | | |
| 14 | ∞ | 1.5000 | 1.516330 | 64.15 |
| 15 | ∞ | 0.0000 | | |

[Aspherical Surface Data]
Surface Number: 11

| | |
|---|---|
| K = | 0.0000 |
| A4 = | −7.14120E−06 |
| A6 = | 2.64560E−09 |
| A8 = | 4.02800E−12 |

[Variable Distances]

| | Infinity | Close Distance |
|---|---|---|
| β = | 0.000 | −1/40 |
| d7 = | 11.99690 | 11.07592 |
| d13 = | 37.52170 | 38.44268 |

[Lens Group Data]

| Group | i | focal length |
|---|---|---|
| G1 | 1 | 218.590 |
| G2 | 8 | 36.090 |

[Values for Conditional Expressions]

| | |
|---|---|
| (1): f2/f = | 1.00 |
| (2): ΣD2/f = | 0.39 |
| (3): f1/f = | 6.07 |
| (4): D2/f = | 0.52 |
| (5): (−f11)/f = | 1.53 |
| (6): (−R21)/f = | 0.40 |

Figure 6A:
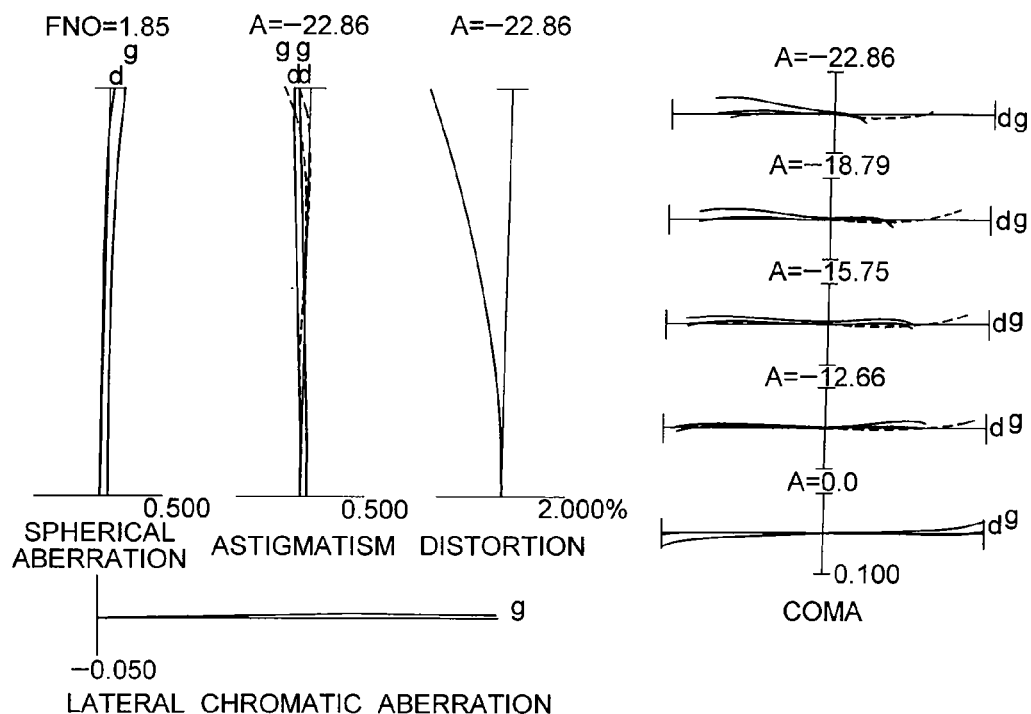
Figure 6B:
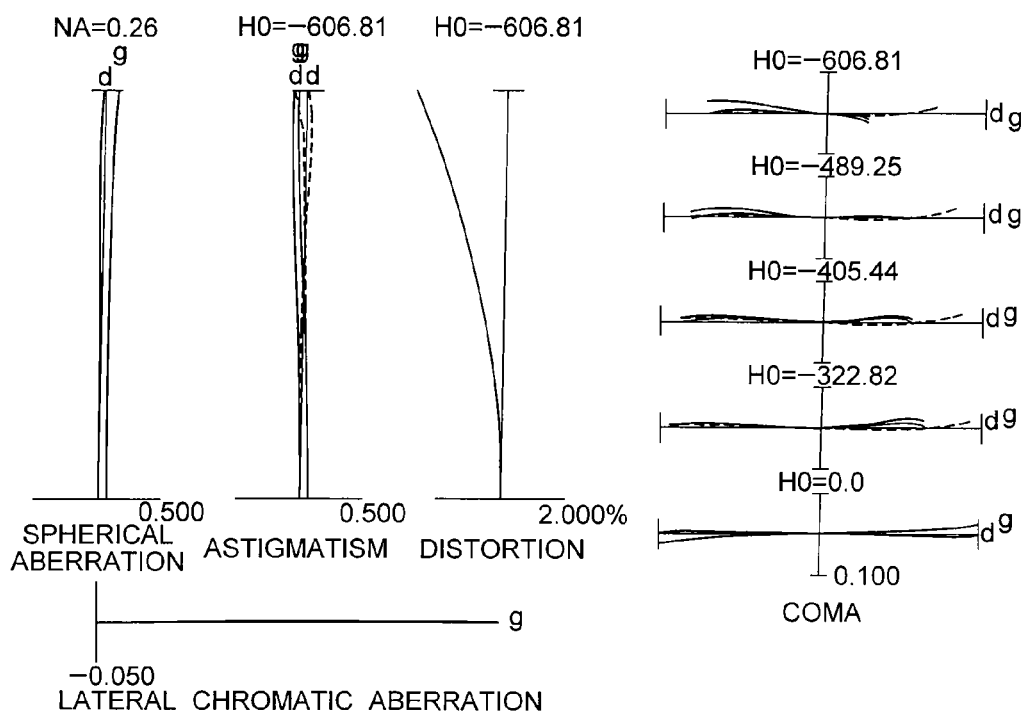

FIGS. 6A and 6B are graphs showing various aberrations of the rear-focus optical system according to Example 3 in which FIG. 6A shows upon focusing on infinity, and FIG. 6B shows upon imaging magnification of β=−1/40.

As is apparent from the respective graphs, the rear-focus optical system according to Example 3 shows superb optical performance as a result of good corrections to various aberrations.

Example 4

Figure 7:
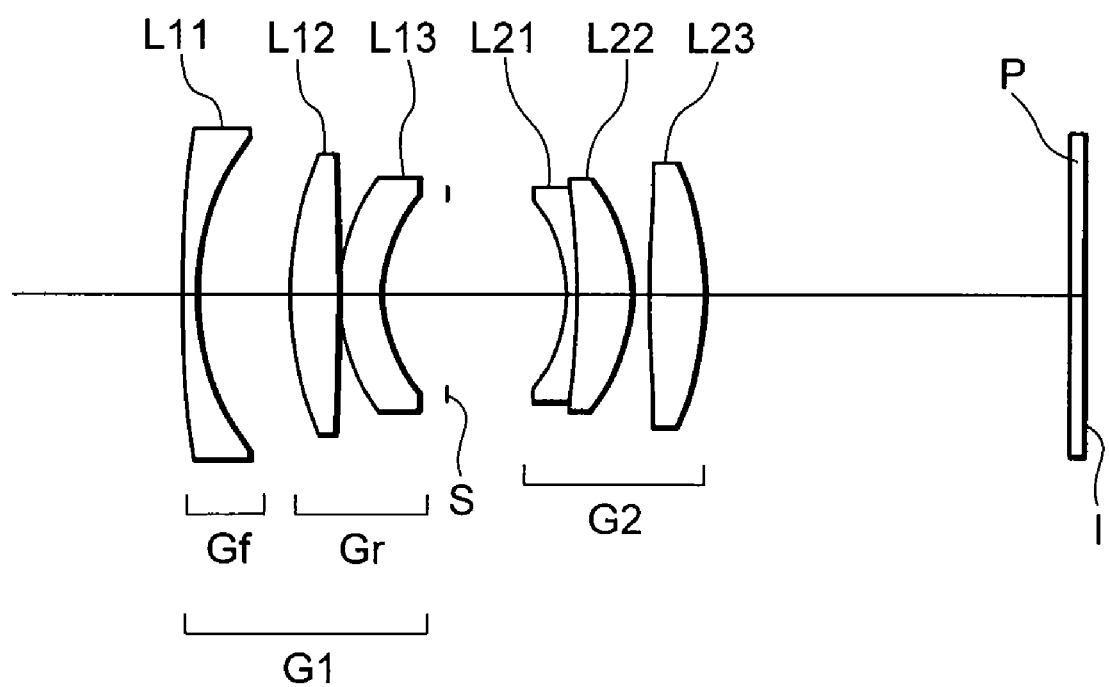
FIG. 7 is a sectional view showing a lens configuration of a rear-focus optical system according to Example 4.

FIG. 7 is a sectional view showing a lens configuration of a rear-focus optical system according to Example 4 of the present application.

The rear-focus optical system according to Example 4 is composed of, in order from an object, a first lens group G1 having positive refractive power, an aperture stop S, and a second lens group G2 having positive refractive power.

The first lens group G1 is composed of, in order from the object, a front lens group Gf having negative refractive power, and a rear lens group Gr having positive refractive power.

The front lens group Gf is composed of a negative meniscus lens L11 having a convex surface facing the object.

The rear lens group Gr is composed of, in order from the object, a positive meniscus lens L12 having a convex surface facing the object, and a negative meniscus lens L13 having a convex surface facing the object.

The second lens group G2 is composed of, in order from the object, a negative meniscus lens L21 having a concave surface facing the object, a positive meniscus lens L22 having a concave aspherical surface facing the object, and a double convex positive lens L23.

In the rear-focus optical system according to Example 4, varying focusing from an object locating at infinity to an object locating at a close distance is carried out by moving the second lens group G2 along the optical axis.

Various values associated with the rear-focus optical system according to Example 4 are listed in Table 4.

TABLE 4

[Specifications]

| | |
|---|---|
| f = | 35.900 |
| FNO = | 1.85 |
| 2ω = | 45.6 |
| Y = | 14.75 |
| TL = | 91.12 |

[Lens Data]

| i | r | d | nd | vd |
|---|---|---|---|---|
| 1 | 115.2190 | 1.4000 | 1.589130 | 61.18 |
| 2 | 26.7689 | 9.5080 | | |
| 3 | 29.8387 | 4.9105 | 1.804000 | 46.58 |
| 4 | 703.4539 | 0.1000 | | |
| 5 | 21.2098 | 4.3151 | 1.846660 | 23.78 |
| 6 | 15.9246 | 5.6887 | | |
| 7 | ∞ | d7 | Aperture Stop S | |
| 8 | −13.6299 | 1.4641 | 1.846660 | 23.78 |
| 9 | −73.5907 | 0.1478 | | |
| 10* | −87.6775 | 5.9057 | 1.744429 | 49.55 |
| 11 | −18.4345 | 0.1000 | | |
| 12 | 601.1271 | 4.8672 | 1.804000 | 46.58 |
| 13 | −29.8090 | d13 | | |
| 14 | ∞ | 1.5000 | 1.516330 | 64.15 |
| 15 | ∞ | 0.0000 | | |

[Aspherical Surface Data]
Surface Number: 10

| | |
|---|---|
| K = | 0.0000 |
| A4 = | −1.78760E−05 |
| A6 = | 3.02180E−08 |
| A8 = | −2.34590E−11 |

[Variable Distances]

| | Infinity | Close Distance |
|---|---|---|
| β = | 0.000 | −1/40 |
| d7 = | 13.34900 | 12.42070 |
| d13 = | 37.86630 | 38.79460 |

TABLE 4-continued

[Lens Group Data]

| Group | i | focal length |
|---|---|---|
| G1 | 1 | 183.977 |
| G2 | 8 | 35.980 |

[Values for Conditional Expressions]

| | |
|---|---|
| (1): f2/f = | 1.00 |
| (2): ΣD2/f = | 0.35 |
| (3): f1/f = | 5.12 |
| (4): D2/f = | 0.53 |
| (5): (−f11)/f = | 1.66 |
| (6): (−R21)/f = | 0.38 |

Figure 8A:
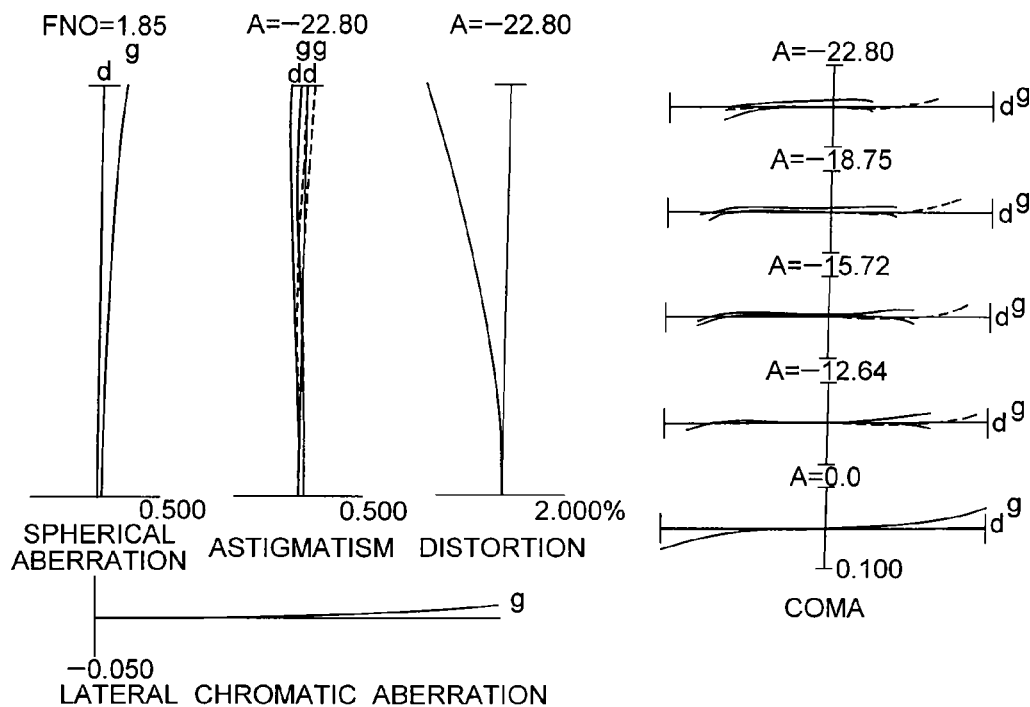
Figure 8B:
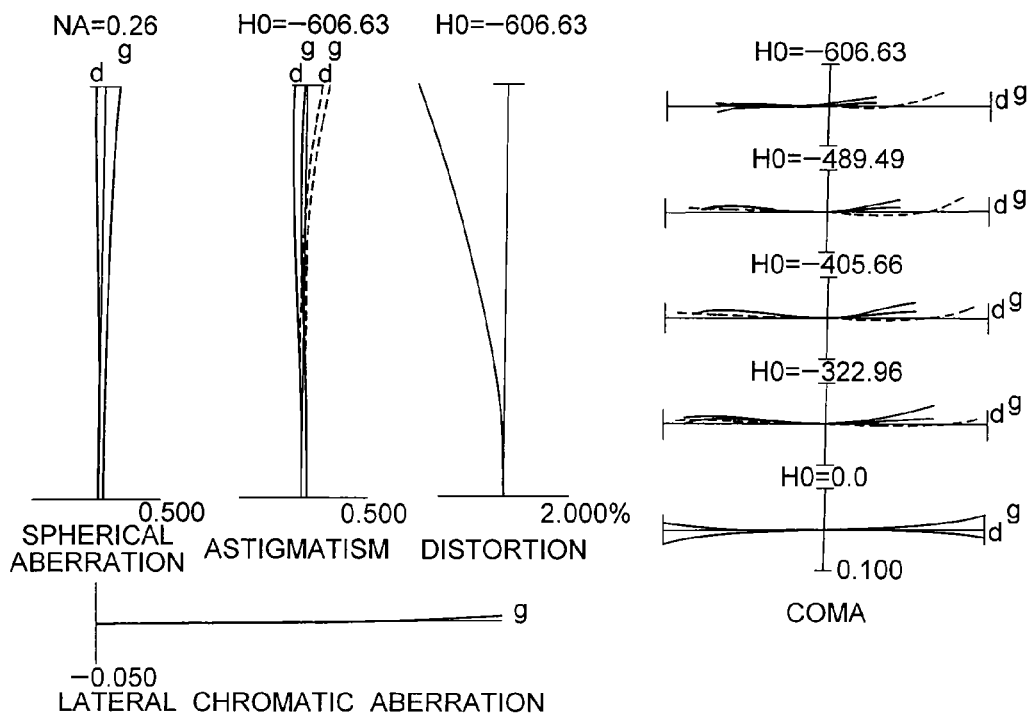

FIGS. 8A and 8B are graphs showing various aberrations of the rear-focus optical system according to Example 4 in which FIG. 8A shows upon focusing on infinity, and FIG. 8B shows upon imaging magnification of β=−1/40.

As is apparent from the respective graphs, the rear-focus optical system according to Example 4 shows superb optical performance as a result of good corrections to various aberrations.

Example 5

FIG. 9 is a sectional view showing a lens configuration of a rear-focus optical system according to Example 5 of the present application.

The rear-focus optical system according to Example 5 is composed of, in order from an object, a first lens group G1 having positive refractive power, an aperture stop S, and a second lens group G2 having positive refractive power.

The first lens group G1 is composed of, in order from the object, a front lens group Gf having negative refractive power, and a rear lens group Gr having positive refractive power.

The front lens group Gf is composed of a negative meniscus lens L11 having a convex surface facing the object.

The rear lens group Gr is composed of, in order from the object, a positive meniscus lens L12 having a convex surface facing the object, and a negative meniscus lens L13 having a convex surface facing the object.

The second lens group G2 is composed of, in order from the object, a cemented lens constructed by a double concave negative lens L21 cemented with a double convex positive lens L22, a positive meniscus lens L23 having a concave surface facing the object and an aspherical surface facing the image, and a positive meniscus lens L24 having a concave surface facing the object.

In the rear-focus optical system according to Example 5, varying focusing from an object locating at infinity to an object locating at a close distance is carried out by moving the second lens group G2 along the optical axis.

Various values associated with the rear-focus optical system according to Example 5 are listed in Table 5.

TABLE 5

[Specifications]

| | |
|---|---|
| f = | 36.010 |
| FNO = | 1.85 |
| 2ω = | 43.78 |
| Y = | 14.1 |
| TL = | 92.00 |

[Lens Data]

| i | r | d | nd | vd |
|---|---|---|---|---|
| 1 | 101.6655 | 1.4000 | 1.589130 | 61.18 |
| 2 | 24.9251 | 9.7114 | | |
| 3 | 28.4458 | 5.2352 | 1.772500 | 49.61 |
| 4 | 2773.6060 | 0.1000 | | |
| 5 | 22.4148 | 5.1255 | 1.834000 | 37.17 |
| 6 | 16.1067 | 5.2021 | | |
| 7 | ∞ | d7 | Aperture Stop S | |
| 8 | −14.5740 | 1.5000 | 1.805180 | 25.43 |
| 9 | 242.4911 | 4.5000 | 1.772500 | 49.61 |
| 10 | −27.9733 | 0.1000 | | |
| 11 | −202.5439 | 3.9427 | 1.804000 | 46.58 |
| 12 | −33.8862 | 0.0500 | 1.553890 | 38.09 |
| 13* | −33.8862 | 0.1000 | | |
| 14 | −125.0061 | 4.0886 | 1.804000 | 46.58 |
| 15 | −30.2277 | d15 | | |
| 16 | ∞ | 1.5000 | 1.516330 | 64.15 |
| 17 | ∞ | 0.0000 | | |

[Aspherical Surface Data]
Surface Number: 13

| | |
|---|---|
| K = | 0.0000 |
| A4 = | 1.00930E−05 |
| A6 = | 7.50730E−09 |
| A8 = | 1.51520E−12 |

[Variable Distances]

| | Infinity | Close Distance |
|---|---|---|
| β = | 0.000 | −1/40 |
| d7 = | 11.94440 | 11.01484 |
| d15 = | 37.50031 | 38.42987 |

[Lens Group Data]

| Group | i | focal length |
|---|---|---|
| G1 | 1 | 188.560 |
| G2 | 8 | 35.940 |

[Values for Conditional Expressions]

| | |
|---|---|
| (1): f2/f = | 1.00 |
| (2): ΣD2/f = | 0.40 |
| (3): f1/f = | 5.24 |
| (4): D2/f = | 0.48 |
| (5): (−f11)/f = | 1.57 |
| (6): (−R21)/f = | 0.40 |

Figure 10A:
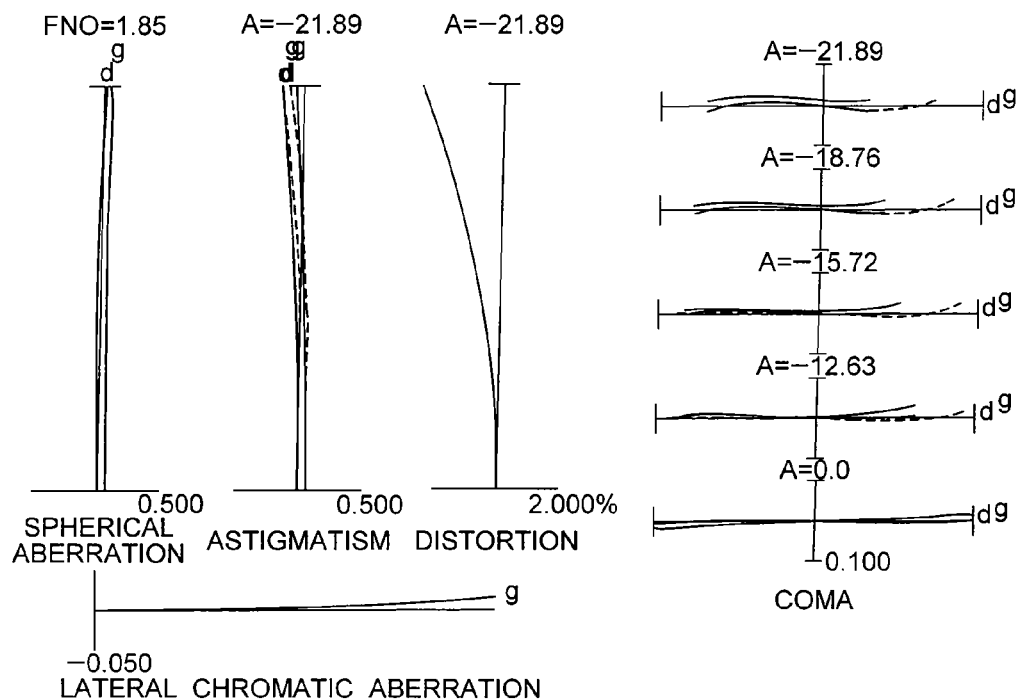
Figure 10B:
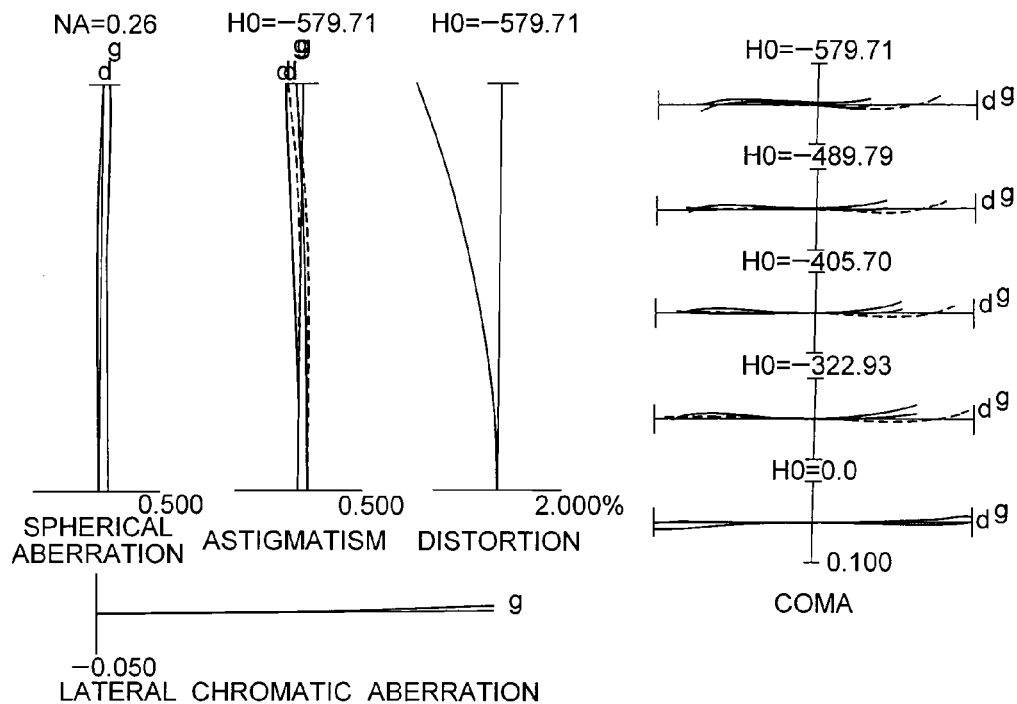

FIGS. 10A and 10B are graphs showing various aberrations of the rear-focus optical system according to Example 5 in which FIG. 10A shows upon focusing on infinity, and FIG. 10B shows upon imaging magnification of β=−1/40.

As is apparent from the respective graphs, the rear-focus optical system according to Example 5 shows superb optical performance as a result of good corrections to various aberrations.

Example 6

Figure 11:
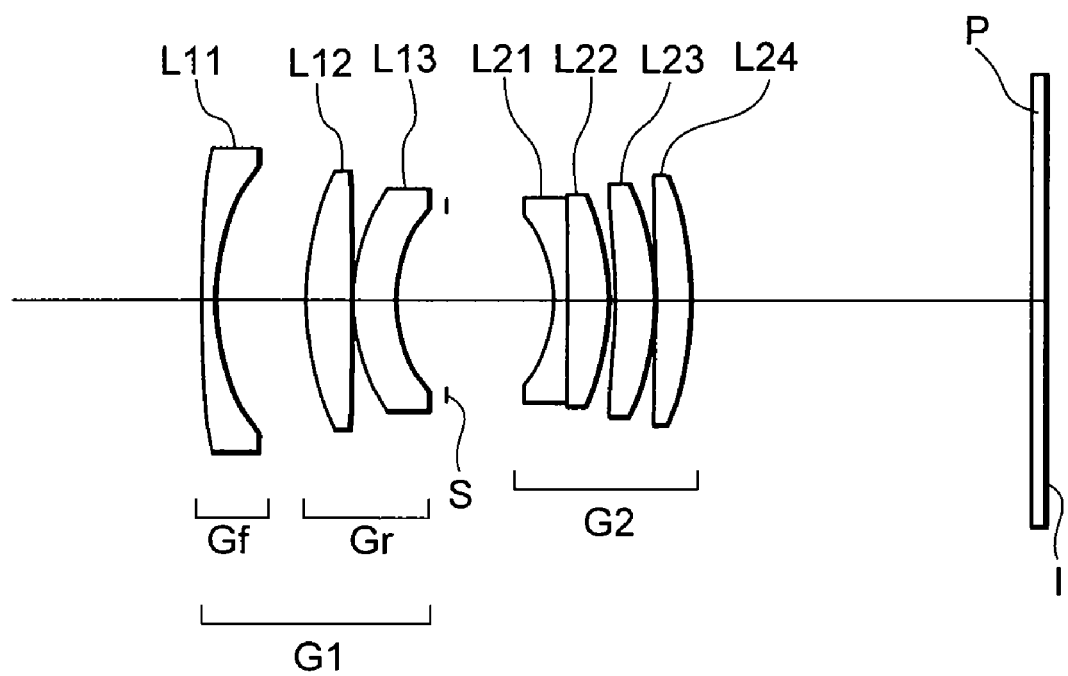
FIG. 11 is a sectional view showing a lens configuration of a rear-focus optical system according to Example 6.

FIG. 11 is a sectional view showing a lens configuration of a rear-focus optical system according to Example 6 of the present application.

The rear-focus optical system according to Example 6 is composed of, in order from an object, a first lens group G1 having positive refractive power, an aperture stop S, and a second lens group G2 having positive refractive power.

The first lens group G1 is composed of, in order from the object, a front lens group Gf having negative refractive power, and a rear lens group Gr having positive refractive power.

The front lens group Gf is composed of a negative meniscus lens L11 having a convex surface facing the object.

The rear lens group Gr is composed of, in order from the object, a double convex positive lens L12, and a negative meniscus lens L13 having a convex surface facing the object.

The second lens group G2 is composed of, in order from the object, a cemented lens constructed by a negative meniscus lens L21 having a concave surface facing the object cemented with a positive meniscus lens L22 having a concave surface facing the object, a positive meniscus lens L23 having a concave aspherical surface facing the object, and a positive meniscus lens L24 having a concave surface facing the object.

In the rear-focus optical system according to Example 6, varying focusing from an object locating at infinity to an object locating at a close distance is carried out by moving the second lens group G2 along the optical axis.

Various values associated with the rear-focus optical system according to Example 6 are listed in Table 6.

TABLE 6

[Specifications]

| | |
|---|---|
| f = | 36.009 |
| FNO = | 1.85 |
| 2ω = | 43.8 |
| Y = | 14.10 |
| TL = | 92.00 |

[Lens Data]

| i | r | d | nd | νd |
|---|---|---|---|---|
| 1 | 132.7002 | 1.4000 | 1.589130 | 61.18 |
| 2 | 25.8526 | 9.5887 | | |
| 3 | 29.7335 | 5.0921 | 1.772500 | 49.61 |
| 4 | −801.6732 | 0.1000 | | |
| 5 | 20.3542 | 4.6491 | 1.834000 | 37.17 |
| 6 | 15.3218 | 5.9701 | | |
| 7 | ∞ | d7 | | |
| 8 | −15.0395 | 1.5000 | 1.846660 | 23.78 |
| 9 | −662.9579 | 4.5000 | 1.804000 | 46.58 |
| 10 | −27.5128 | 0.6896 | | |
| 11* | −100.0000 | 0.0500 | 1.553890 | 38.09 |
| 12 | −100.0000 | 4.3863 | 1.804000 | 46.58 |
| 13 | −29.2280 | 0.1000 | | |
| 14 | −289.2477 | 3.7290 | 1.804000 | 46.58 |
| 15 | −38.0644 | d15 | | |
| 16 | ∞ | 1.5000 | 1.516330 | 64.15 |
| 17 | ∞ | 0.0000 | | |

[Aspherical Surface Data]
Surface Number: 11

| | |
|---|---|
| K = | 0.0000 |
| A4 = | −8.70710E−06 |
| A6 = | 5.02240E−09 |
| A8 = | −4.59940E−12 |

[Variable Distances]

| | Infinity | Close Distance |
|---|---|---|
| β = | 0.000 | −1/40 |
| d7 = | 11.24520 | 10.30289 |
| d15 = | 37.49940 | 38.44171 |

TABLE 6-continued

[Lens Group Data]

| Group | i | focal length |
|---|---|---|
| G1 | 1 | 160.337 |
| G2 | 8 | 36.588 |

[Values for Conditional Expressions]

| | |
|---|---|
| (1): f2/f = | 1.02 |
| (2): ΣD2/f = | 0.42 |
| (3): f1/f = | 4.45 |
| (4): D2/f = | 0.48 |
| (5): (−f11)/f = | 1.52 |
| (6): (−R21)/f = | 0.42 |

Figure 12A:
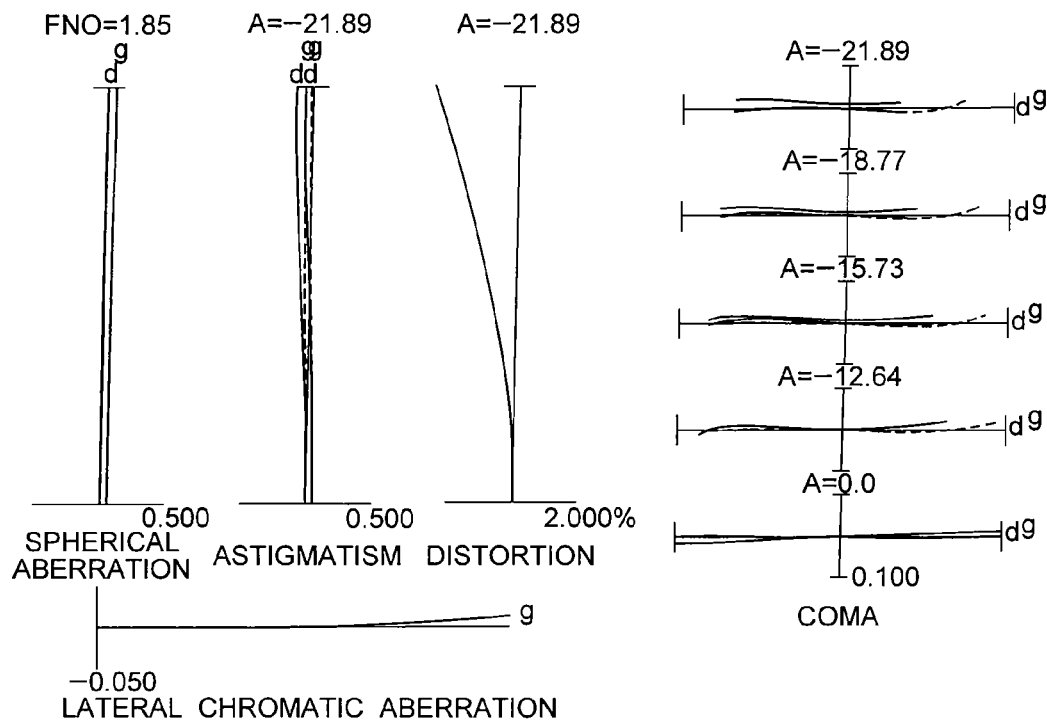
Figure 12B:
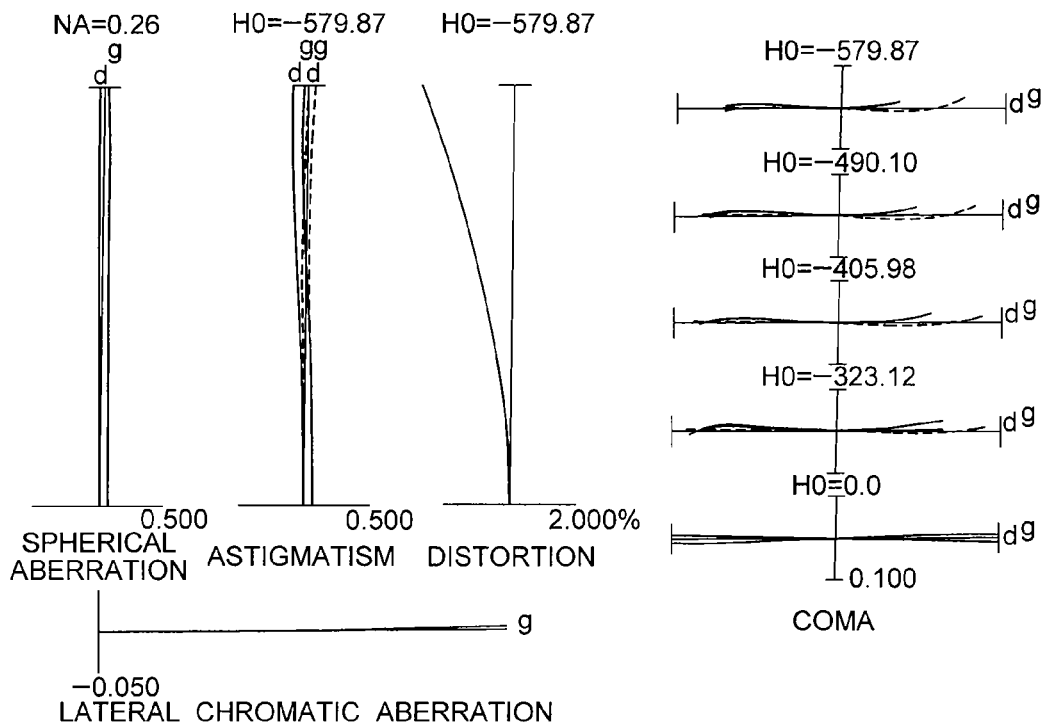

FIGS. 12A and 12B are graphs showing various aberrations of the rear-focus optical system according to Example 6 in which FIG. 12A shows upon focusing on infinity, and FIG. 12B shows upon imaging magnification of β=−1/40.

As is apparent from the respective graphs, the rear-focus optical system according to Example 6 shows superb optical performance as a result of good corrections to various aberrations.

Each example according to the present application makes it possible to provide a large aperture rear-focus optical system having excellent optical performance with the f-number of about 1.8 to 2.0 and a half angle of view of about 22 degrees, capable of varying focusing from infinity to a close distance despite of compactness thereof.

Here, in each case of the above-described conventional lenses, since a bulky, heavy lens group has to be moved for focusing, when the lens is made to be so-called auto focus by using a motor, it becomes impossible to carry out quick focusing, so that it becomes a problem. On the other hand, in each Example of the present application, since the focusing lens group is the second lens group G2, which is light in weight, it becomes possible to carry out quick focusing with an appropriate moving amount with suppressing variation of aberrations.

An outline of a method for manufacturing the rear-focus optical system including, in order from an object, a first lens group G1 having positive refractive power, an aperture stop S, and a second lens group G2 having positive refractive power is explained below with reference to FIG. 14.

FIG. 14 is a flowchart showing a procedure of a method for manufacturing the rear-focus optical system according to the present application.

At first, each lens of the first lens group G1, and the second lens group G2 is disposed in a lens barrel having cylindrical shape such that at least a portion of the second lens group G2 is movable along an optical axis of the rear-focus optical system upon focusing, and each lens of the first lens group G1 and the second lens group G2 satisfies the following conditional expression (1):

$$0.80 < f2/f < 1.30 \quad (1)$$

where f2 denotes a focal length of the second lens group, and f denotes a focal length of the rear-focus optical system.

Although a rear-focus optical system with a two-lens-group configuration is shown as each numerical Example of the present application, the configuration of a rear-focus optical system is not limited to this, the present application can be applied to other lens-group configurations such as a three-lens-group configuration.

In each Example, in order to vary focusing from an object locating at infinity to an object locating at a close distance, a portion of a lens group, a single lens group, or a plurality of lens groups may be moved along the optical axis as a focusing lens group. In particular, at least one portion of the second lens group is suitable for the focusing lens group. The focusing lens group(s) may be used for auto focus, and suitable for being driven by a motor such as an ultrasonic motor.

A lens group or a portion of a lens group may be sifted in a direction perpendicular to the optical axis as a vibration reduction lens group for correcting an image blur caused by a camera shake. In a rear-focus optical system according to the present application, it is particularly preferable that a portion of the first lens group or the whole of the first lens group is used as a vibration reduction lens group.

Moreover, any lens surface of a rear-focus optical system according to the present application may be an aspherical surface. The aspherical surface may be fabricated by a fine grinding process, a glass molding process that a glass material is formed into an aspherical shape by a mold, or a compound type process that a resin material is formed into an aspherical shape on a glass surface.

An antireflection coating having high transmittance over a broad wavelength range may be applied to each lens surface of a rear-focus optical system according to the present application to reduce flare or ghost images, so that high optical performance with a high contrast can be attained.

In a rear-focus optical system according to the present application, although an aperture stop S is preferably disposed between the first lens group G1 and the second lens group G2, the function may be substituted by a lens frame without disposing a member as an aperture stop S.

A rear-focus optical system according to the present application may be used as a zoom lens system by varying the distance between the first lens group G1 and the second lens group G2.

Incidentally, the above described each feature may suitably be applied within limits that do not deteriorate optical performance of a rear-focus optical system according to the present application.

The present embodiment only shows a specific example for the purpose of better understanding of the present invention. Accordingly, it is needless to say that the invention in its broader aspect is not limited to the specific details and representative devices shown and described herein.

Then, an imaging apparatus (camera) equipped with a rear-focus optical system according to the present application is explained with reference to FIG. 13.

Figure 13:
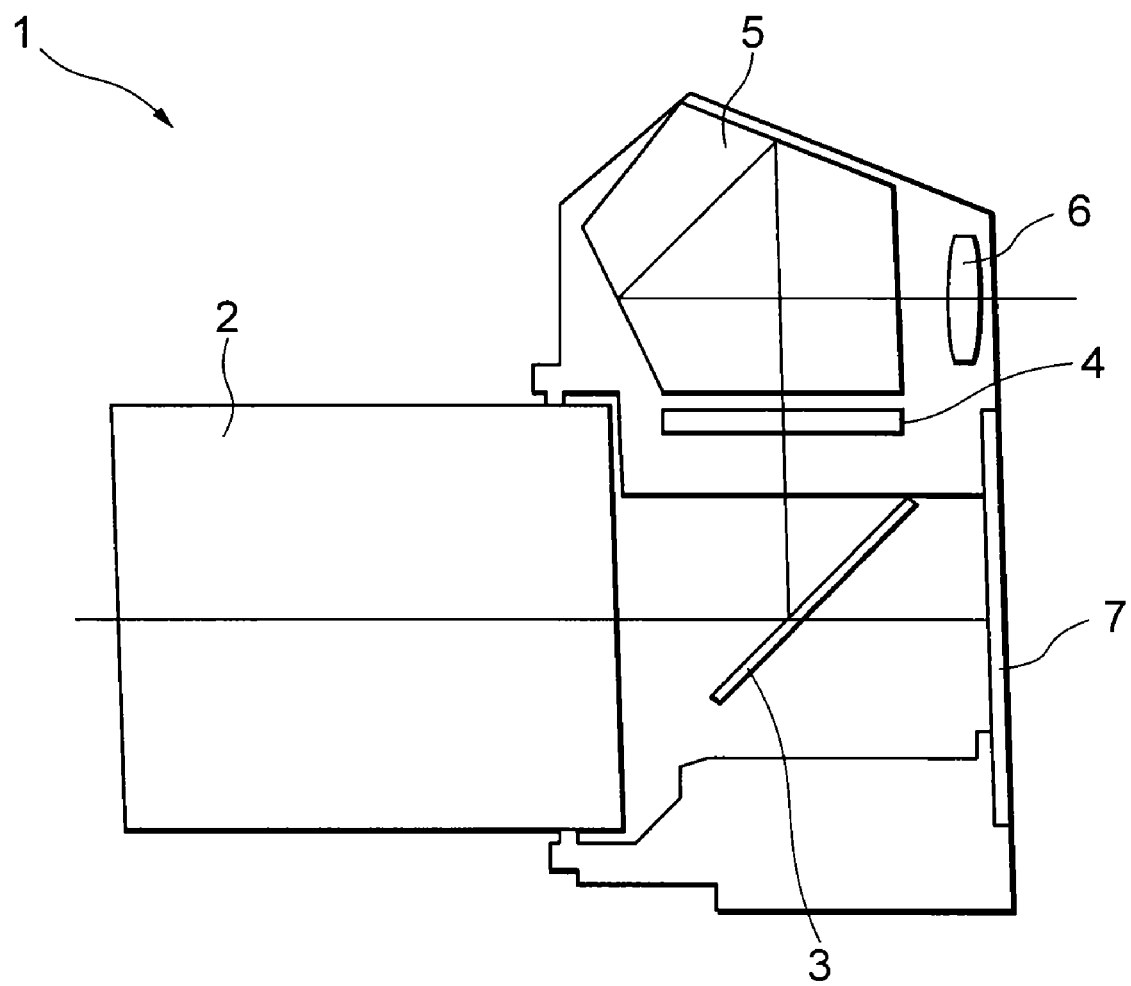
FIG. 13 is a diagram showing an imaging apparatus (camera) equipped with the rear-focus optical system according to Example 1.

FIG. 13 is a diagram showing an imaging apparatus (camera) equipped with the rear-focus optical system according to Example 1.

As shown in FIG. 13, the camera 1 is a single-lens reflex digital camera equipped with the rear-focus optical system according to Example 1 as an image-taking lens 2.

In the camera 1, light emitted from an object (not shown) is converged by the image-taking lens 2, and focused on a focusing screen 4 through a quick return mirror 3. The object image focused on the focusing screen 4 is reflected a plurality of times by a pentagonal roof prism 5, and led to an eyepiece 6. Therefore, a photographer can observe the object image as an erected image through the eyepiece 6.

When the photographer presses a shutter release button (not shown), the quick return mirror 3 is retracted from an optical path, and the light from the object (not shown) reaches an imaging device 7. Accordingly, light emitted from the object is captured by the imaging device 7 and stored in a memory (not shown) as an object image. In this manner, the photographer can take a picture of an object by the camera 1.

The rear-focus optical system according to Example 1 installed in the camera 1 as an image-taking lens 2 realizes a compact rear-focus optical system with excellent optical performance by means of the characteristic lens configuration described in Example 1. Accordingly, the camera 1 makes it possible to realize an imaging apparatus capable of taking a picture of a compact rear-focus optical system with excellent optical performance.

Although the above-described example is shown a case composing a camera 1 equipped with the rear-focus optical system according to Example 1, it is needless to say that the similar effect can be obtained by a camera equipped with a rear-focus optical system according to any one of Examples 2 through 6 of the present application.

As described above, the present application makes it possible to provide a compact rear-focus optical system with excellent optical performance, an imaging apparatus, and a method for focusing the rear-focus optical system.

What is claimed is:

1. A rear-focus optical system comprising, in order from an object:
   a first lens group having positive refractive power;
   an aperture stop; and
   a second lens group having positive refractive power;
   at least one portion of the second lens group being movable along an optical axis of the rear-focus optical system upon focusing,
   the following conditional expression being satisfied:

$$0.80 < f2/f < 1.30$$

where f2 denotes a focal length of the second lens group, and f denotes a focal length of the rear-focus optical system.

2. The rear-focus optical system according to claim 1, wherein the following conditional expression being satisfied:

$$0.30 < \Sigma D2/f < 0.60$$

where f denotes a focal length of the rear-focus optical system, and $\Sigma D2$ denotes a thickness of the second lens group along the optical axis.

3. The rear-focus optical system according to claim 1, wherein the following conditional expression is satisfied:

$$2.00 < f1/f < 8.00$$

where f1 denotes a focal length of the first lens group, and f denotes a focal length of the rear-focus optical system.

4. The rear-focus optical system according to claim 1, wherein the following conditional expression is satisfied:

$$0.30 < D2/f < 0.60$$

where D2 denotes a distance along the optical axis between the first lens group and the second lens group upon focusing an object locating at infinity, and f denotes a focal length of the rear-focus optical system.

5. The rear-focus optical system according to claim 1, wherein the first lens group includes, in order from the object, a front lens group having negative refractive power, and a rear lens group having positive refractive power,
   a distance along the optical axis between the front lens group and the rear lens group is the largest among respective distances between adjoining lenses composing the first lens group.

6. The rear-focus optical system according to claim 1, wherein the first lens group includes, in order from the object, a front lens group having negative refractive power, and a rear lens group having positive refractive power, and
   the following conditional expression is satisfied:

$$1.10 < (-f11)/f < 3.50$$

where f11 denotes a focal length of the front lens group in the first lens group, and f denotes a focal length of the rear-focus optical system.

7. The rear-focus optical system according to claim 1, wherein the most object side lens surface of the second lens group is a concave surface facing the object.

8. The rear-focus optical system according to claim 1, wherein the most object side lens surface of the second lens group is a concave surface facing the object, and the following conditional expression is satisfied:

$$0.30<(-R21)/f<0.50$$

where R21 denotes a radius of curvature of the concave surface facing the object, and f denotes a focal length of the rear-focus optical system.

9. The rear-focus optical system according to claim 1, wherein the second lens group includes an aspherical surface.

10. The rear-focus optical system according to claim 1, wherein each lens surface composing the first lens group is a spherical surface.

11. An imaging apparatus equipped with the rear-focus optical system according to claim 1.

12. A method for manufacturing a rear-focus optical system that includes, in order from an object, a first lens group having positive refractive power, an aperture stop, and a second lens group having positive refractive power, the method comprising steps of:

providing at least a portion of the second lens group movable along an optical axis of the rear-focus optical system upon focusing; and providing each lens of the first lens group and the second lens group satisfying the following conditional expression:

$$0.80<f2/f<1.30$$

where f2 denotes a focal length of the second lens group, and f denotes a focal length of the rear-focus optical system.

13. The method according to claim 12, further comprising a step of:

satisfying the following conditional expression:

$$0.30<\Sigma D2/f<0.60$$

where f denotes a focal length of the rear-focus optical system, and $\Sigma D2$ denotes a thickness of the second lens group along the optical axis.

14. The method according to claim 12, further comprising a step of:

satisfying the following conditional expression:

$$2.00<f1/f<8.00$$

where f1 denotes a focal length of the first lens group, and f denotes a focal length of the rear-focus optical system.

15. The method according to claim 12, further comprising a step of:

satisfying the following conditional expression:

$$0.30<D2/f<0.60$$

where D2 denotes a distance along the optical axis between the first lens group and the second lens group upon focusing an object locating at infinity, and f denotes a focal length of the rear-focus optical system.

* * * * *

UNITED STATES PATENT AND TRADEMARK OFFICE
CERTIFICATE OF CORRECTION

PATENT NO. : 7,903,348 B2
APPLICATION NO. : 12/388571
DATED : March 8, 2011
INVENTOR(S) : Takayuki Sensui Page 1 of 1

It is certified that error appears in the above-identified patent and that said Letters Patent is hereby corrected as shown below:

On the Title Page:

Item (30) Foreign Application Priority Data should read as follows:

(30) Foreign Application Priority Data

March 4, 2008 (JP) ..........................................2008-053714
January 22, 2009 (JP) ..........................................2009-012357

Signed and Sealed this

Seventeenth Day of April, 2012

David J. Kappos
*Director of the United States Patent and Trademark Office*